United States Patent [19]

Decker et al.

[11] Patent Number: 5,375,051

[45] Date of Patent: Dec. 20, 1994

[54] APPARATUS USING SERIAL DATA LINE TO TURN ON A TRANSCEIVER OR OTHER DEVICE

[75] Inventors: David G. Decker, Sunnyvale; William G. Howell, Half Moon Bay, both of Calif.

[73] Assignee: Diablo Research Coporation, Sunnyvale, Calif.

[21] Appl. No.: 976,695

[22] Filed: Nov. 13, 1992

[51] Int. Cl.⁵ .................. H02M 11/00; H04M 11/00
[52] U.S. Cl. ...................... 363/49; 323/901; 375/8; 379/98
[58] Field of Search ........ 363/49, 60, 50–58; 361/91, 92, 90, 111; 323/901; 379/97–99; 375/8, 9

[56] References Cited

U.S. PATENT DOCUMENTS

| | | | |
|---|---|---|---|
| 4,288,831 | 9/1981 | Dolikian | 361/92 |
| 4,373,117 | 2/1993 | Pierce | 379/98 |
| 4,395,590 | 7/1983 | Pierce et al. | 379/98 |
| 4,578,533 | 3/1986 | Pierce | 379/98 X |
| 4,671,721 | 3/1987 | Busam et al. | |
| 4,691,344 | 9/1987 | Brown et al. | 379/98 X |
| 5,086,454 | 2/1992 | Hirzel | |

OTHER PUBLICATIONS

Attachment Ho8, "PCMCIA I/O Card Interface Specification", Revision 1.00, Draft, PCMCIA, May 6, 1992 (6 pages).

Primary Examiner—Emanuel T. Voeltz
Attorney, Agent, or Firm—Skjerven, Morrill, MacPherson, Franklin & Friel

[57] ABSTRACT

An apparatus and a method for using a serial data line to turn on an electrical device are disclosed. Energy is extracted from a data signal on an asynchronous serial data line using a charge pump. The extracted energy is used by a power supply switching circuit to turn power on. Once turned on, power is kept on by a keepalive circuit. A shutdown signal causes the power to be turned off.

29 Claims, 7 Drawing Sheets

APPARATUS USING SERIAL DATA LINE TO TURN ON A TRANSCEIVER OR OTHER DEVICE

FIELD OF THE INVENTION

This invention relates to an apparatus for conserving energy in an electrical device, and in particular, an apparatus for extracting energy from a serial data pin of a media access device to turn on the device.

BACKGROUND OF THE INVENTION

Media access devices for personal computers (PCs) have proliferated in the last few years. A large number of media access devices such as modems, LAN adapters and specialized wireless communication cards currently under development are based on the PCMCIA standard (as defined in the PCMCIA I/O Card Interface Specification available from Personal Computer Memory Card International Association of 10308 East Duane Avenue, Sunnyvale, Calif. 94086, which is incorporated herein by reference). Such media access devices for laptop PCs typically use battery based power supplies. When not in use, such media access devices act as a drain on the battery. It is desirable to switch off the power supply to a media access device when the device is not being used. Switching off of the power supply is preferably done automatically to avoid cumbersome manual switches and to avoid battery drain in cases when the user forgets to switch off the device. It is also desirable that this automatic operation be done via one of the pins of the media access device in order to avoid providing a separate line just for power supply switching. Under the PCMCIA standard, although there is a POWERB pin defined as pin 4, it is allocated for power control of a DAA, telephone interface, and is not available for switching power on the media access device. Since all the pins are allocated by the PCMCIA standard, it is desirable that an energy conservation circuit in the media access device be responsive to messages sent on an asynchronous serial data line.

An energy conservation circuit inside a media access device must meet three important criteria for conserving battery power. First, the energy conservation circuit must power down the device when so instructed on an internal shutoff line. Second, in order to conserve scarce battery power, the energy conservation circuit and the rest of the device must draw absolutely no power once the media access device has been powered down. Third, the energy conservation circuit must power up by itself and turn on the power to the rest of the device when instructed to do so on the serial data transfer pin even though there is no power in the media access device. These three criteria are necessary for saving battery power in laptop PC media access devices.

The first criterion is relatively straightforward to implement in a media access device via a circuit that turns itself off on receipt of a shutdown signal. However, the second criterion is not satisfied by most present day sleep/wake-up circuits since they use some power during the sleep mode to monitor the host device. Any non-negligible power consumption during the sleep mode can add up over extended periods of time resulting in an unnecessary drain on the battery. The reason most sleep/wake-up circuits monitor the host device is the difficulty in satisfying the third criterion. It is not a trivial matter for any device to turn back on again after being powered down. When a device is completely powered off and there is absolutely no power in the device, none of the circuits in the device can respond to external messages.

SUMMARY OF THE INVENTION

An energy conservation circuit inside an electrical device according to this invention contains a startup circuit which uses a charge pump to extract energy out of transitions on an asynchronous serial data line. The energy conservation circuit also contains a power supply switching circuit which responds to a signal applied to its signal input. The energy extracted from the asynchronous serial data line is used by the startup circuit to apply a signal at the signal input of the power supply switching circuit which responds by connecting the power supply to the power inputs of other circuits in the electrical device.

Once the energy conservation circuit is powered up by its startup circuit, it is kept powered up by a keepalive circuit. The keepalive circuit is driven by the power supplied at the output of the power supply switching circuit. The keepalive circuit supplies part of this power to the startup circuit which uses this energy to continue to apply the necessary signal at the signal input of the power supply switching circuit. The net effect of the keepalive circuit is to feed to the startup circuit the energy necessary to ensure that the power supply switching circuit keeps the power supply connected to the rest of the device.

A shutdown circuit in the energy conservation circuit of the electrical device is responsive to a shutdown signal. Application of the shutdown signal causes the shutdown circuit to apply a signal to an input of the startup circuit. This causes the startup circuit to stop applying the necessary signal to the signal input of the power supply switching circuit which responds by disconnecting the power supply from its outputs. Once the power supply is disconnected, the keepalive circuit automatically ceases supplying energy to the startup circuit thus powering down the energy conservation circuit. Loss of power in the energy conservation circuit deactivates the rest of the media access device thus shutting down power in the entire system.

DESCRIPTION OF THE INVENTION

Figure 1:
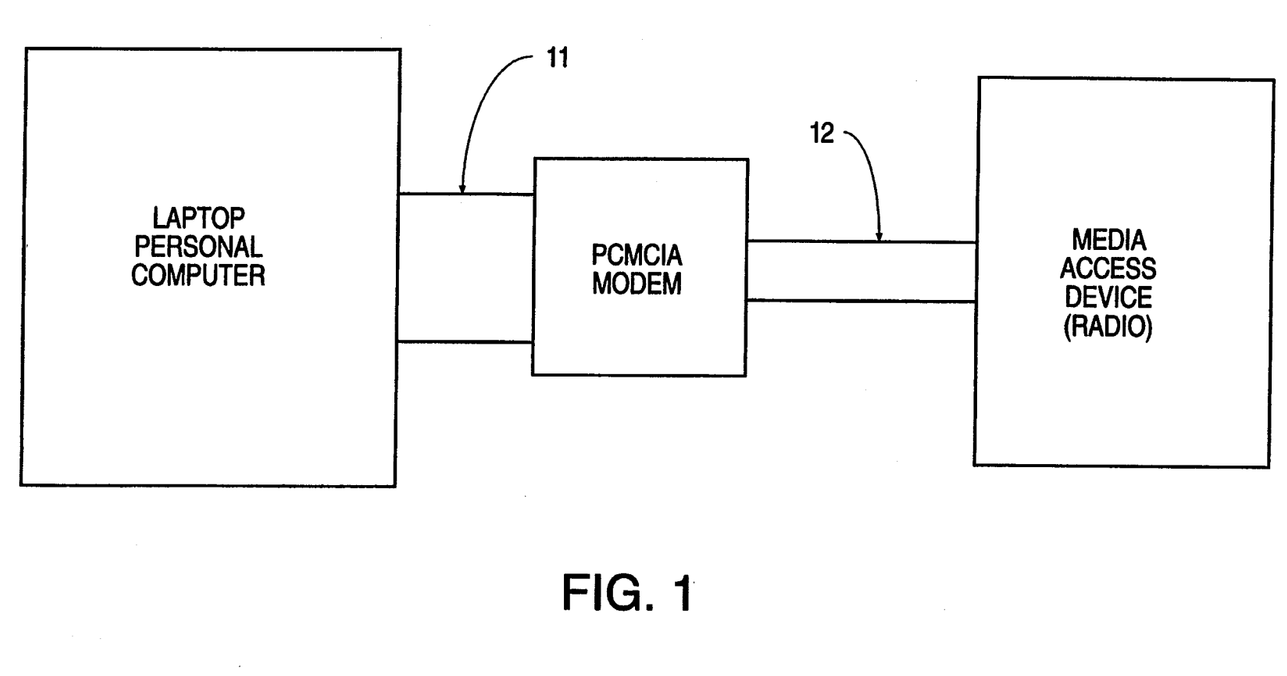
FIG. 1 shows a block diagram of a media access device such as a radio transceiver connected to a laptop PC via a PCMCIA modem.

As shown in FIG. 1, a laptop PC may be connected to a PCMCIA modem via a 68 pin PCMCIA Connector 11. The PCMCIA modem is connected to a media access device such as a radio via a 25 pin PCMCIA Connector 12.

Figure 2:
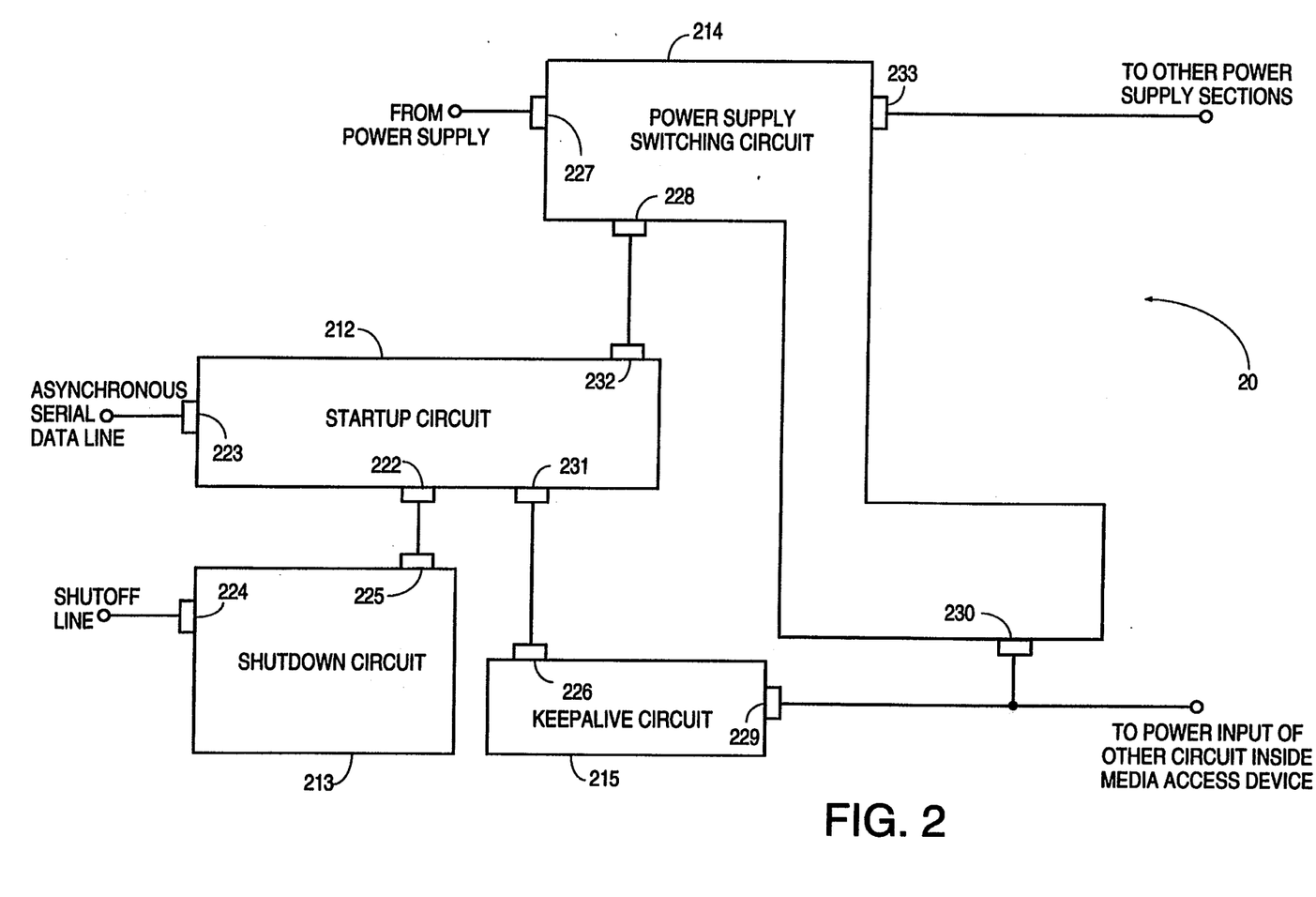
FIG. 2 shows a block diagram of an energy conservation circuit inside the media access device of FIG. 1.

FIG. 2 is a block diagram of an energy conservation circuit 20 resident inside a media access device. Energy conservation circuit 20 consists of a startup circuit 212, a shutdown circuit 213, a keepalive circuit 215 and a power supply switching circuit 214. An input 223 of startup circuit 212 is connected to a TXD pin of the media access device which is connected an asynchronous serial data line from the PCMCIA modem. Startup circuit 212 has a shutdown input 222 connected to an output 225 of shutdown circuit 213. Shutdown circuit 213 has an input 224, the VDCOff line, connected to a microcontroller in the media access device. Startup circuit 212 has a keepalive input 231 connected to an output 226 of keepalive circuit 215. Keepalive circuit 215 has an input 229 connected to a power output 230 of power supply switching circuit 214. Power output 230 is connected to power inputs of other circuits inside the media access device. A power input 227 of power supply switching circuit 214 is connected to a power supply. A power supply section output 233 of power supply switching circuit 214 is connected to other power supply sections.

In order to power up the media access device, the PCMCIA modem sends a startup message on the asynchronous serial data line connected to the TXD pin of the media access device. The startup message causes transitions on the TXD pin which is connected inside the media access device to input 223 of startup circuit 212. A diode charge pump inside startup circuit 212 uses these transitions to extract enough energy to pull down signal input 228 of power supply switching circuit 214. When signal input 228 is pulled down, power supply switching circuit 214 connects its power input 227 to its power output 230 and power supply section output 233.

As soon as power input 227 of power supply switching circuit 214 is connected to power output 230, power appears at input 229 of keepalive circuit 215. This appearance of power causes keepalive circuit 215 to supply the necessary energy to keepalive input 231 of startup circuit 212 which in turn pulls low on signal input 228 of power supply switching circuit 214. Thus keepalive circuit 215 is driven by power supply switching circuit 214 to feed startup circuit 212 the energy necessary to keep power supply switching circuit 214 from disconnecting its power input 227 from its power output 230. This in turn causes keepalive circuit 215 to continuously keep supplying the necessary energy to startup circuit 212 which continues to pull low on signal input 228 of power supply switching circuit 214 thus resulting in an uninterrupted power supply to the rest of the media access device. The net effect of keepalive circuit 215 is that once the energy conservation circuit has been turned on by startup circuit 212, keepalive circuit 215 keeps the device powered up and running even if transitions are longer present on the TXD pin.

A shutdown signal on an internal shutoff line connected to the VDCOff line is generated by a computer in the media access device whenever the modem instructs the media access device to shutdown. This signal is also generated by the computer whenever the battery in the modem goes low or whenever the power to the modem is switched off. This internal shutdown signal is a two level direct current signal. A shutdown signal on the VDCOff line drives input 224 of shutdown circuit 213 high. This in turn causes shutdown circuit 213 to pull down on shutdown input 222 of startup circuit 212.

This causes startup circuit 212 to stop pulling down on signal input 228 of power supply switching circuit 214. In response, power supply switching circuit 214 disconnects its power input 227 from its power output 230 and power supply section output 233. This in turn results in loss of power at input 229 of keepalive circuit 215 which in turn ceases its supply of energy to startup circuit 212. This in turn frees shutdown circuit 213 from having to pull down on shutdown input 222 of startup circuit 212. Loss of power at power output 230 and power supply section output 233 deactivates the rest of the media access device and shuts down power in the entire system.

Figure 3:
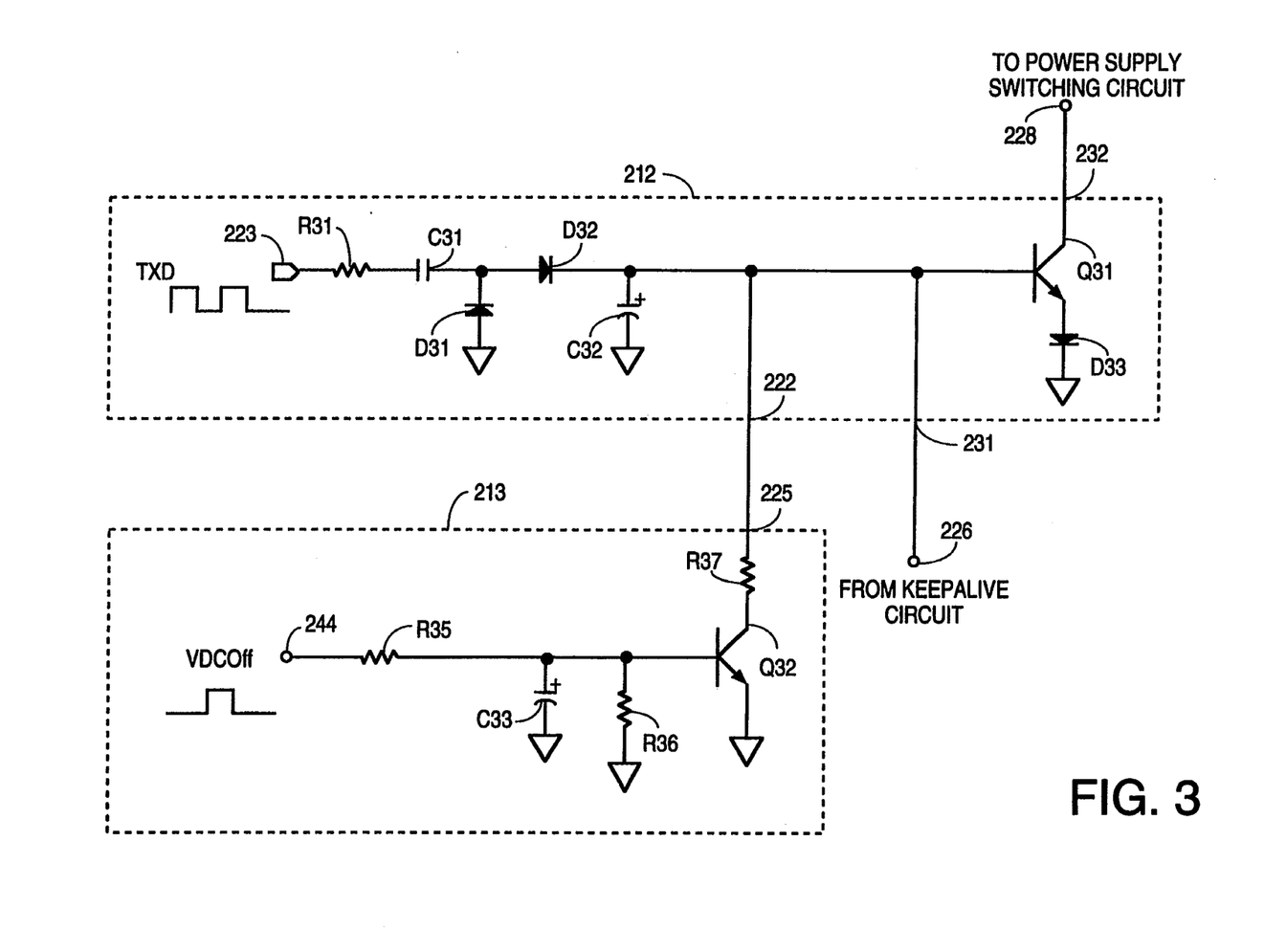
FIG. 3 illustrates an embodiment of the startup circuit and the shutdown circuit of FIG. 2.

FIG. 3 illustrates a circuit diagram of an embodiment of startup circuit 212 and shutdown circuit 213 of FIG. 2. Startup circuit 212 consists of a resistor R31 connected at one end to the TXD pin 223 of the media access device and at the other end to a capacitor C31. A diode D32 is connected from the capacitor C31 to the base of transistor Q31. The anode of diode D32 is also coupled to the cathode of a diode D31. The anode of diode D31 is connected to ground. The positive terminal of a capacitor C32 is connected to the base of a transistor Q31. The negative terminal of capacitor C32 is connected to ground. The emitter of transistor Q31 is connected to the ground via a diode D33. Output 225 of shutdown circuit 213 is also connected to the base of transistor Q31. Output 226 of keepalive circuit 215 is also connected to the base of transistor Q31 (FIG. 4). The collector of transistor Q31 is connected to signal input 228 of power supply switching circuit 214. In startup circuit 212, capacitor C32 is typically larger than capacitor C31. In this particular embodiment, C32 is ten times the rating of C31. Illustrative ratings of capacitors C31 and C32, along with ratings for various other components used in this embodiment are listed in the Appendix.

FIG. 3 also illustrates an embodiment of shutdown circuit 213 of FIG. 2. Shutdown circuit 213 consists of a resistor R35 connected at one end to the VDCOff line 224 internal to the media access device and at the other end to the base of a transistor Q32. Also connected to the base of transistor Q32 is the positive terminal of a capacitor C33, whose negative terminal is connected to ground. Also connected to the base of transistor Q32 is one end of a resistor R36, whose other end is connected to ground. The emitter of transistor Q32 is connected to ground while the collector is connected to output 225 of shutdown circuit 213 via a resistor R37. Output 225 of shutdown circuit 213 is connected to shutdown input 222 of startup circuit 212.

Figure 4:
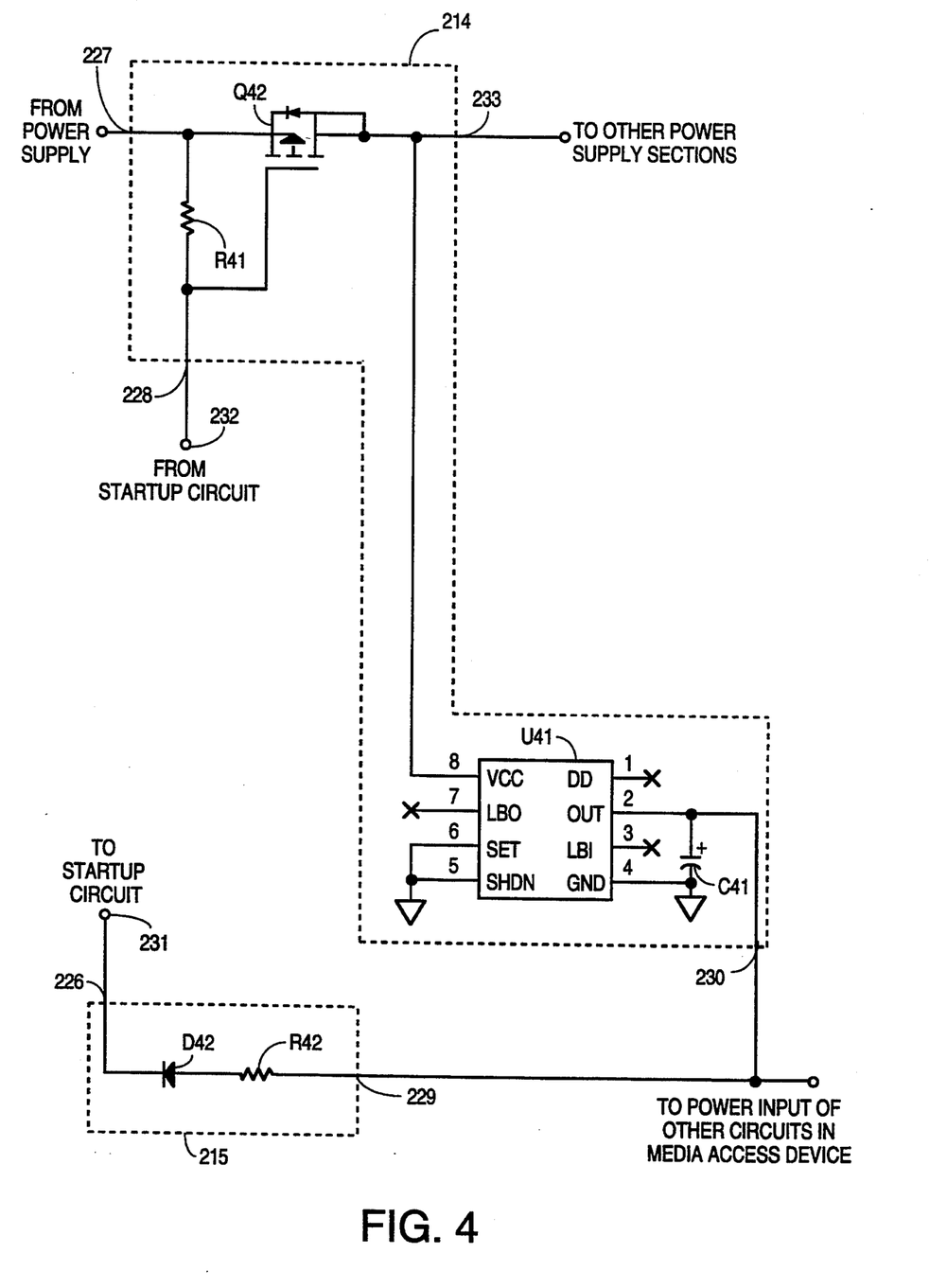
FIG. 4 illustrates an embodiment of the power supply switching circuit and the keepalive circuit of FIG. 2.

Power supply switching circuit 214 is shown in greater detail in FIG. 4. Signal input 228 of power supply switching circuit 214 is connected to power supply input 227 via a resistor R41. Signal input 228 is also connected to the gate of a field effect transistor (FET) switch Q42. In this particular embodiment, FET Q42 is a dual P-channel enhancement mode MOSFET integrated circuit. The source of FET Q42 is connected to power input 227 of power supply switching circuit 214. The drain of FET Q42 is connected to power supply section output 233 of power supply switching circuit 214. The drain of FET Q42 is also connected to the Vcc pin of a voltage regulator U41 (which is MAX667ESA LOW-DROPOUT in this embodiment). The pins "set", "shdn" and "gnd" of voltage regulator U41 are connected to ground. The "out" pin of voltage regulator U41 is connected to power output 230 of power supply switching circuit 214. The "out" pin is also connected to a positive terminal of a capacitor C41, whose negative terminal is connected to ground.

FIG. 4 also shows input 229 of keepalive circuit 215 is connected via a resistor R42 and a diode D42 to its output 226.

Figures 5, 5A:
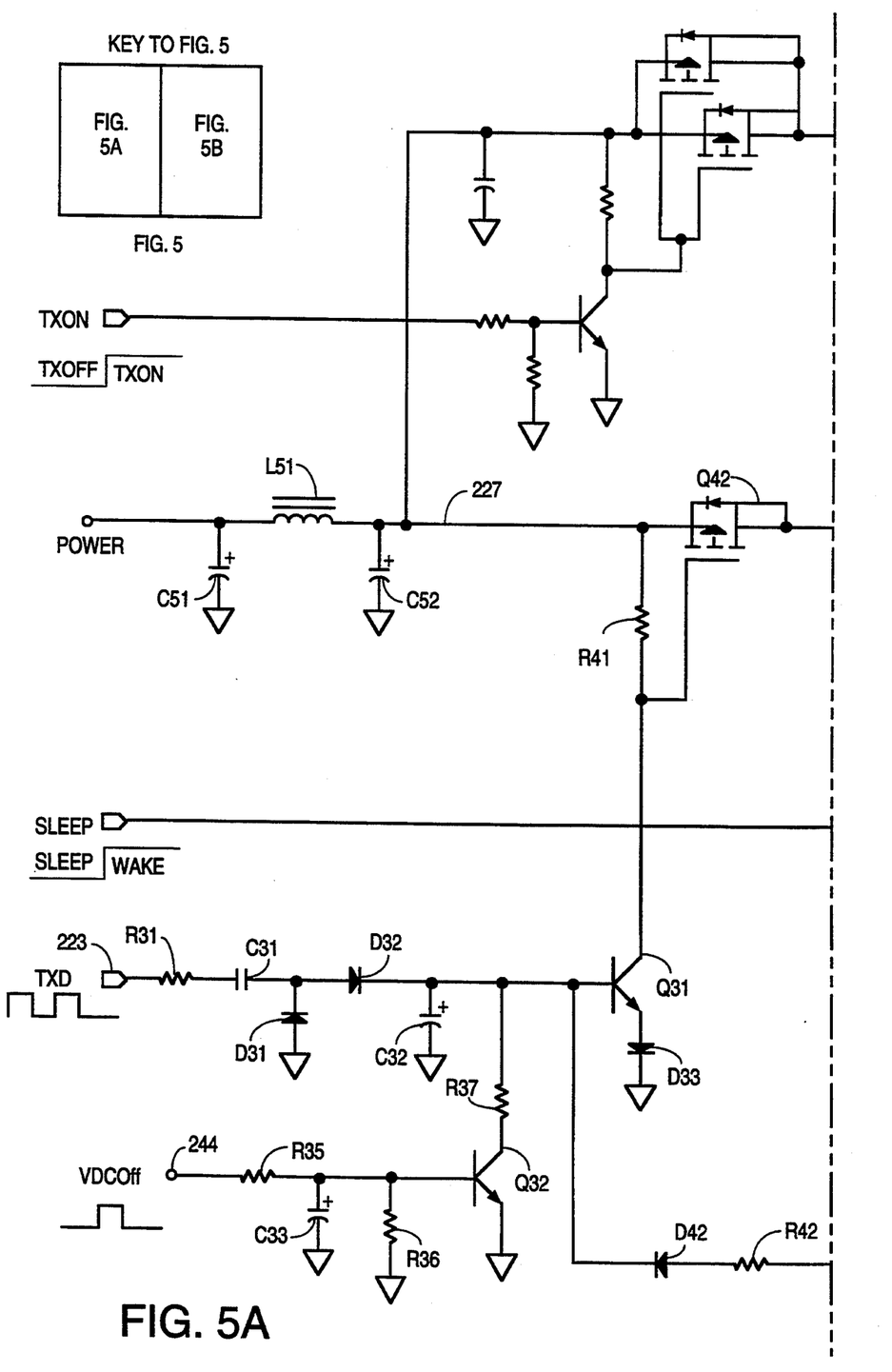
FIG. 5 illustrates a power supply circuit incorporating an energy conservation circuit in accordance with this invention.
Figure 5B:
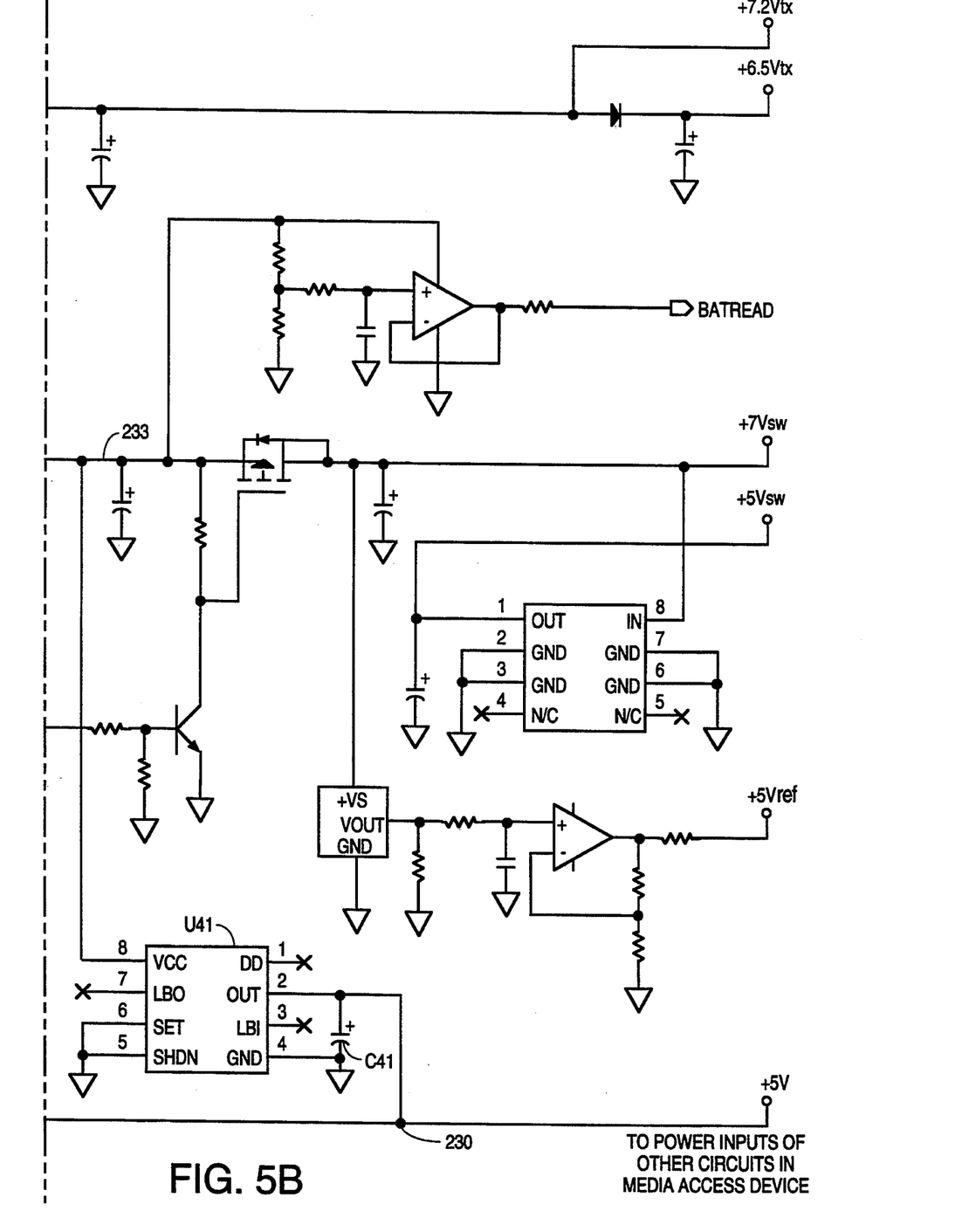
Figure 6A:
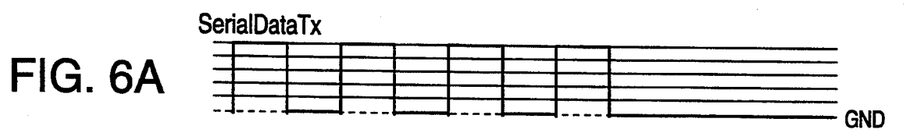
FIGS. 6A-H are an illustrative conceptual timing diagram for various points in the circuit of FIG. 5 on receipt of a dense transition signal and on receipt of a shutdown signal.
Figure 6B:
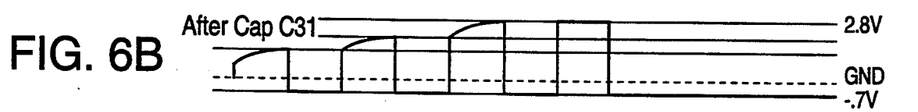
Figure 6C:
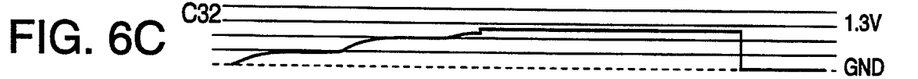
Figure 6D:
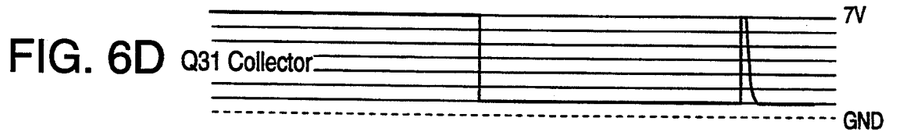
Figure 6E:
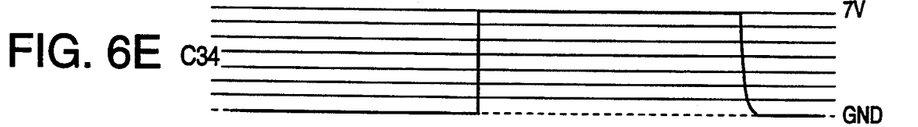
Figure 6F:
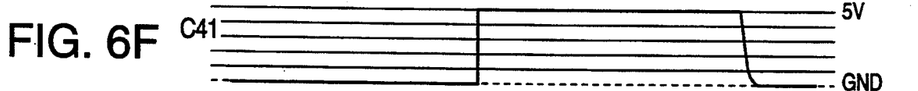
Figure 6G:
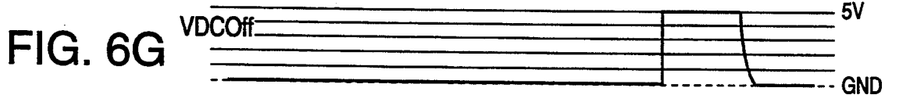

The operation of the energy conservation circuit in the following discussion pertains to the circuit shown in FIG. 5 and the illustrative timing diagram shown in FIG. 6. FIG. 5 illustrates a power supply circuit incorporating the energy conservation circuit described above. The power supply circuit shown in FIG. 5 is part of a radio transceiver which acts as a media access device for laptop PCs. FIG. 6 illustrates conceptually the timing relationship in the electrical behavior of various points in the circuit of FIG. 5 on receipt of a startup signal and on receipt of a shutdown signal. A startup signal sent on an asynchronous serial data line (TXD pin) may consist of dense transitions as shown in FIG. 6A. Dense transitions may consist of any number of 1s and any number of 0s alternating in any pattern. The startup signal in this particular embodiment is a series of hexadecimal characters AAAA or 5555. This data pattern may be sent at any reasonable speed such as 9.6 kbps or 19.2 kbps. The transitions must be reasonably fast and must be more than a handful in number to ensure that the energy conservation circuit is not turned on by noise. A circuit responsive to just a high level or to a few transitions could get turned on by noise on the asynchronous serial data line. A number of fast transitions are more representative of the types of messages typically sent by the modem. On receipt of such a startup signal consisting of dense transitions, capacitor C31 charges up on each transition (FIG. 6B) and the combination of diodes D31 and D32 and capacitors C31 and C32 act as a charge pump so that the charge on capacitor C32 builds up as shown in FIG. 6C. It is capacitor C31 in the startup circuit that requires the multiple transitions that enable a charge to build up in capacitor C32. Dense transitions are necessary to prevent the charge in capacitor C32 from bleeding away over time as a result of its leakage current. The larger the ratio C32/C31, the more the number of transitions needed by C32 to charge up and the less the likelihood of the energy conservation circuit being turned on by just a few transitions. In this particular embodiment, ten to twenty transitions are necessary and sufficient for charge in capacitor C32 to build up to an appreciable level. FIGS. 6B and 6C show a device being latched after three transitions. As soon as the charge on capacitor C32 builds up to the necessary startup voltage (approximately 1.2 volts in this embodiment) transistor Q31 turns on. Thus the collector of transistor Q31 goes low and pulls down the gate of FET Q42 (FIG. 6D). This in turn causes FET Q42 to turn on, thus supplying approximately 7 volts from power input 227 to voltage regulator U41 (as shown in FIG. 6E). Also shown in the timing diagram at FIG. 6F is the charge at capacitor C41 caused by the voltage regulator stepping down the 7 volts input to 5 volts, which is supplied to power output 230 of power supply switching circuit 214. Appearance of power at power output 230 of power supply switching circuit 214 causes keepalive circuit 215 to maintain the base of transistor Q31 high thereby keeping transistor Q31 and FET Q42 turned on. FIG. 6C shows the latching of the keepalive circuit in the center of the figure. The sharp edge that occurs as the voltage on capacitor C32 reaches its steady state represents the moment diode D42 causes capacitor C32 to charge up just a little higher than the voltage necessary to turn on transistor Q31. Once the energy conservation circuit is powered up, it stays powered up and ignores any further data arriving on TXD pin 223 of the media access device. Resistor R31 in the energy conservation circuit allows the data arriving on the asynchronous serial data line to be read by other circuits in the media access device.

Figure 6H:
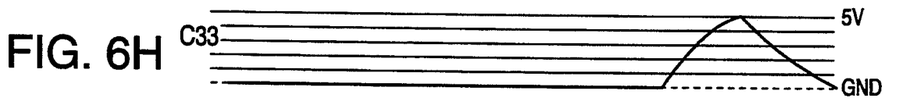

When a shutdown message arrives from the modem, the computer inside the media access device pulls VDCOff line 224 high which pulls the base of transistor Q32 high which in turn pulls the base of transistor Q31 low. Once the base of Q31 is grounded through transistor Q32, FET Q42 is turned off and power input 227 is disconnected from voltage regulator U41. Thus no power is supplied to power output 230 of power supply switching circuit 214. Thus no energy is supplied by keepalive circuit 215 to startup circuit 212. As seen from FIG. 6H, capacitor C33 discharges slowly and delatches power supply switching circuit 214 by pulling the base of transistor Q31 low well after keepalive circuit 215 ceases supplying energy to startup circuit 212. Slow discharge of capacitor C33 ensures that the energy conservation circuit does not turn back on again while still in the process of shutting down. Once the energy conservation circuit shuts down, there is no power dissipation in the entire media access device (since FET Q42 is switched off).

The description of an embodiment of this invention is intended to be illustrative and not limiting. Numerous other embodiments will be apparent to those skilled in the art, all of which are included within the broad scope of this invention. For example, instead of the TXD pin of the PCMCIA standard, it is possible to use other asynchronous serial data lines such as RS232. Furthermore, the apparatus and method according to this invention are not confined to media access devices. They can be used in any electrical device that contains an asynchronous serial data line which may be used to turn on a power supply.

APPENDIX
Illustrative Component Ratings used in this Embodiment

| Component | Rating | Component | Rating |
|---|---|---|---|
| C31 | 0.1 μF | Q31 | MMBT2222A |
| C32 | 1.0 μF | Q32 | MMBT2222A |
| C33 | 1.0 μF | Q42 | SI9953DY |
| C41 | 22 μF | R31 | 5.1 KΩ |
| C52 | 22 μF | R35 | 62 KΩ |
| D31 | MMBD352L | R36 | 100 KΩ |
| D32 | MMBD352L | R37 | 100 Ω |
| D41 | MMBD914LT1 | R41 | 47 KΩ |
| D42 | MMBD914LT1. | R42 | 10 KΩ |
| L51 | 5 μH | U41 | MAX667ESA LOW-DROPOUT |

We claim:

1. An apparatus for conserving power in an electrical device, said apparatus comprising:

a power supply switching circuit for providing a connection between a power supply and said electrical device, said power supply switching circuit having a signal input, a power input and a power output;

a startup circuit having an output connected to said signal input of said power supply switching circuit, said startup circuit generating a signal in response to transitions on a serial data transfer line, said signal being applied by said startup circuit to said signal input of said power supply switching circuit so as to switch on said power supply switching circuit;

a shutdown circuit, said shutdown circuit causing said startup circuit to switch off said power supply switching circuit in response to a shutdown signal; and a keepalive circuit having an input connected to said power supply switching circuit, said keepalive circuit maintaining said power supply switching circuit in an on condition in the absence of said shutdown signal.

2. The apparatus of claim 1 wherein said startup circuit comprises a charge pump.

3. The apparatus of claim 2 wherein said charge pump comprises a plurality of diodes and a plurality of capacitors.

4. The apparatus of claim 3 wherein said startup circuit comprises two capacitors, the rating of one capacitor being higher than the rating of the other capacitor.

5. The apparatus of claim 4 wherein the rating of said one capacitor is ten times the rating of said other capacitor.

6. The apparatus of claim 1 wherein said startup circuit comprises (i) a first diode connected between a first capacitor and a base of a transistor and (ii) a second capacitor connected to the base of said transistor.

7. The apparatus of claim 6 wherein the rating of said second capacitor is larger than the rating of said first capacitor.

8. The apparatus of claim 1 wherein said shutdown circuit comprises a capacitor and a transistor.

9. The apparatus of claim 1 wherein said shutdown circuit comprises two resistors, a capacitor and a transistor and wherein the collector of said transistor is connected to the output of said shutdown circuit.

10. The apparatus of claim 1 wherein said power supply switching circuit comprises a switching means.

11. The apparatus of claim 10 wherein said switching means comprises a field effect transistor, said signal input of said power supply switching circuit being connected to the gate of said field effect transistor.

12. The apparatus of claim 11 wherein said power supply switching circuit further comprises a voltage regulator connected to said field effect transistor.

13. The apparatus of claim 1 wherein said keepalive circuit comprises a diode and a resistor.

14. The apparatus of claim 13 wherein the anode of said diode is connected to said resistor and the cathode of said diode is connected to the output of said keepalive circuit.

15. A method for turning on an electrical device having a power supply and a power input for connection to said power supply, said electrical device receiving a data signal, said data signal comprising a plurality of transitions, said method comprising:

using said plurality of transitions in said data signal to generate a turn on signal; and using said turn on signal to connect said power supply to said power input thereby turning on said electrical device.

16. The method claimed in claim 15 further comprising feeding back energy from said power supply to continue to generate said turn on signal.

17. The method claimed in claim 16 further comprising disconnecting said power supply from said power input on receipt of a shutdown signal.

18. The method of claim 15 wherein said generating a turn on signal comprises using a charge pump to generate a voltage from said plurality of transitions in a data signal.

19. A method of turning on a power supply comprising the step of extracting energy from transitions on an asynchronous serial data line.

20. The method of claim 19 wherein said transitions comprise a series of ones and zeros in any alternating pattern.

21. The method of claim 15 wherein said electrical device does not consume any power prior to receiving said plurality of transitions.

22. The method of claim 15 wherein said generation of said turn on signal occurs while no power is being consumed in said electrical device.

23. The method of claim 15 wherein said using said turn on signal comprises turning on a transistor, said transistor connecting said power supply to said power input.

24. The method of claim 19 wherein said plurality of transitions comprises at least three transitions.

25. An apparatus comprising:

a power supply switching circuit that provides a connection between a power supply and an electrical device; and a startup circuit connected to said power supply switching circuit, said startup circuit generating a turn on signal in response to a plurality of transitions on a serial data transfer line;

wherein said turn on signal is applied to said power supply switching circuit, thereby causing said power supply switching circuit to provide said connection between said power supply and said electrical device.

26. The apparatus of claim 25 wherein said electrical device does not consume any power prior to said plurality of transitions being received by said startup circuit.

27. The apparatus of claim 25 wherein said startup circuit comprises a first capacitor and a second capacitor, wherein a number of transitions required to generate said turn on signal depends on a rating of said first capacitor and a rating of said second capacitor.

28. The apparatus of claim 25 wherein said power supply switching circuit disconnects said power supply from said electrical device in the absence of said turn on signal.

29. The apparatus of claim 26 further comprising a keepalive circuit having an input connected to said power supply switching circuit, said keepalive circuit using energy from said power supply to provide energy for said turn on signal to said startup circuit thereby avoiding use of said transitions.

* * * * *

UNITED STATES PATENT AND TRADEMARK OFFICE
CERTIFICATE OF CORRECTION

PATENT NO. : 5,375,051
DATED : Dec. 20, 1994
INVENTOR(S) : David G. Decker, et al.

It is certified that error appears in the above-identified patent and that said Letters Patent is hereby corrected as shown below:

On the title page item [75] Inventors:

"David G. Decker, Sunnyvale; William G. Howell, Half Moon Bay" should read -- William G. Howell, Half Moon Bay; David G. Decker, Sunnyvale--.

Signed and Sealed this

Third Day of February, 1998

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,375,051
DATED : Dec. 20, 1994
INVENTOR(S) : William G. Howell, et al.

It is certified that error appears in the above-identified patent and that said Letters Patent is hereby corrected as shown below:

On title page item [19] should read "Howell et al." and item [75] Inventors: should read --William G. Howell, Half Moon Bay; David G. Decker, Sunnyvale --.

This certificate supersedes Certificate of Correction issued February 3, 1998.

Signed and Sealed this

Thirty-first Day of March, 1998

*Attest:*

BRUCE LEHMAN

*Attesting Officer*     *Commissioner of Patents and Trademarks*